Jan. 26, 1932.                H. HEUSER                1,842,872
                    PRODUCTION OF CARBONATED LIQUIDS
                       Original Filed June 28, 1926
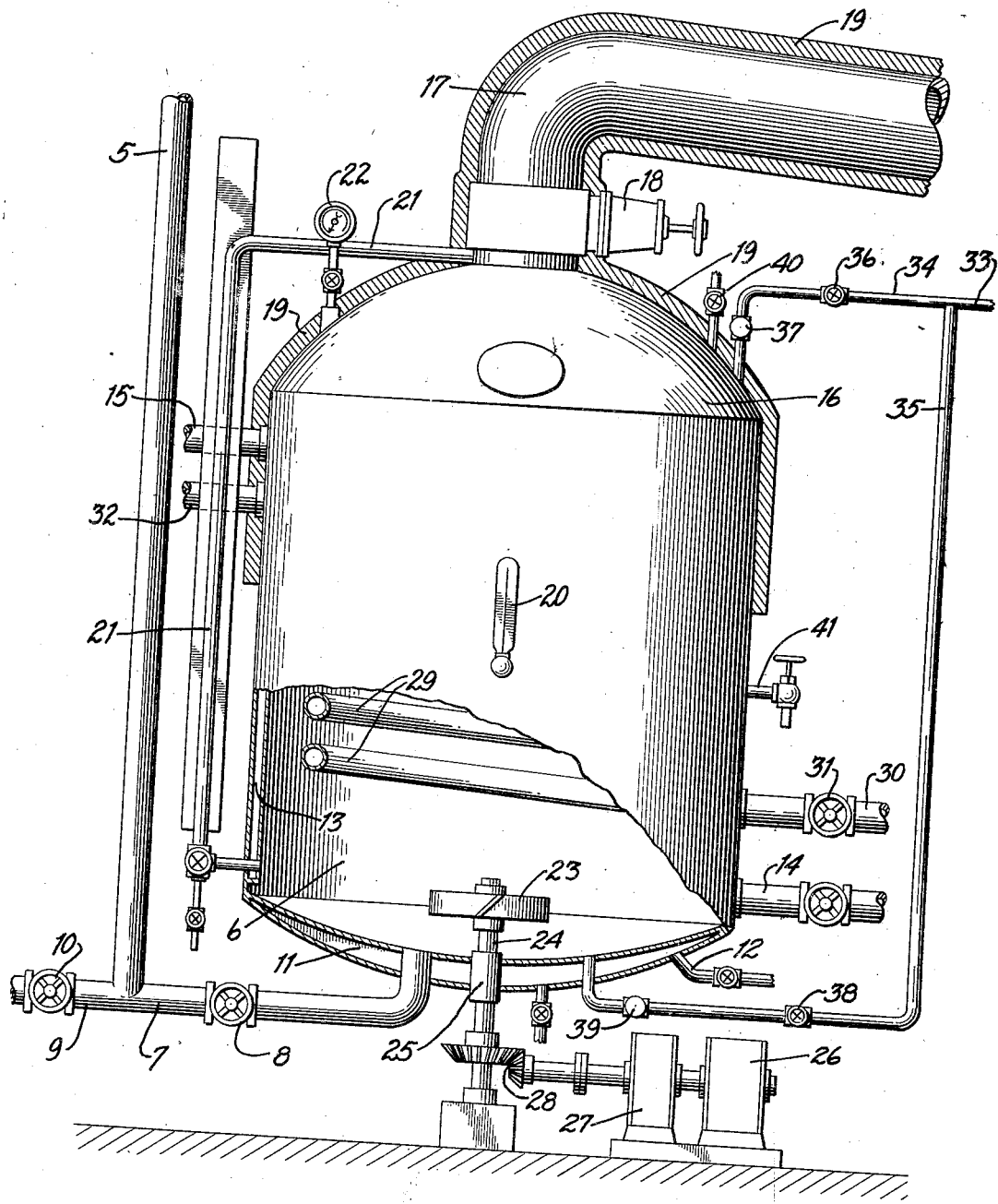
Inventor:
Herman Heuser,
By Dynrenforth, Lee, Chritton & Wiles,
Attys.

Patented Jan. 26, 1932

1,842,872

UNITED STATES PATENT OFFICE

HERMAN HEUSER, OF CHICAGO, ILLINOIS, ASSIGNOR TO UNITED STATES PROCESS CORPORATION, OF CHICAGO, ILLINOIS, A CORPORATION OF ILLINOIS

PRODUCTION OF CARBONATED LIQUIDS

Original application filed June 28, 1926, Serial No. 119,057. Divided and this application filed November 8, 1928. Serial No. 318,095.

The present invention relates to the production of carbonated liquids and more particularly of such liquids produced from stocks derived by fermentation. Thus, my invention may be employed for the production of fermented malt liquids of the tonic or medicinal type as well as of fermented malt or fruit juice beverages and of carbonated beverage liquids generally miscible.

The invention will be fully understood from the following description, illustrated by the accompanying drawing, in which apparatus suitable for carrying the invention into effect is diagrammatically illustrated, partly in section.

In carrying out my invention, the liquid treated is preferably an alcohol containing liquid freed from toxic constituents such as aldehydes and fusel oils, as described in my prior application Serial No. 119,057, filed June 28, 1926, (of which this application is a division), such liquids being particularly suitable for permissible tonic and medicinal uses.

In the following description of my invention, I have set forth a particular embodiment of apparatus and have, for convenience in description, referred to an ordinary fermented malt-cereal liquid, e. g., beer, as the initial material. It will be readily understood that other apparatus may be employed and that other materials may be employed; for example, a malt-cereal liquid of high extract value of the medicinal tonic type, a fermented fruit juice, or a distilled and diluted product intended for medicinal purposes, or for non-alcoholic liquids. The initial material employed may be considered as containing 5% of alcohol by volume in the specific example set forth.

Referring to the drawing, the liquid to be treated is supplied from a suitable source, such as a dealcoholizer or heater, through the line 5 to the kettle 6. In the flow of the liquid to the kettle 6, it passes through the pipe 5 into the pipe 7 leading into the bottom of the kettle, the latter pipe being provided with valve 8. A branch pipe 9 provided with valve 10 also connects with the pipe 7, so that the contents of the kettle 6 may be discharged through the pipes 7 and 9 from the system.

The kettle 6 is provided in its base with a jacket 11 to which steam may be supplied through a valved pipe 12. The kettle 6 is likewise provided around its side walls with a jacket 13, which does not communicate with the jacket 11, and to which water or other suitable cooling medium may be supplied through the valved pipe 14, making its exit through the pipe 15. The upper portion of the kettle 6 is domed, as at 16, and is provided with a vapor pipe 17, a valve 18 of gate or other suitable type being provided in the outlet pipe 17 as close to the top of the kettle as is practicable. To prevent condensation, the upper portion of the kettle and the vapor-outlet pipe are lagged with any suitable thermal insulation, as indicated at 19. The kettle 6 is provided with any desired control and observation devices, for example, thermometer 20, liquid gauge 21 and pressure gauge 22.

In the lower portion of the kettle 6 there is provided a stirrer 23, suitably mounted upon a rotatable vertical shaft 24 which passes through a stuffing box 25 in the bottom of the kettle, and is driven by any suitable device, for example, by the motor 26 through the speed reducer 27 and the gearing 28. Within the kettle 6 there are likewise provided a series of coils 29 to which brine or other suitable cooling medium may be supplied through the inlet pipe 30 provided with valve 31. The cooling medium may make its exit from the coils 29 through the outlet pipe 32. A pipe 33, leading from any suitable source of carbon-dioxide under pressure, divides into two branches 34 and 35, the former leading to the upper portion of the kettle 6 and the latter into the kettle at its bottom. The line 34 is provided with a control valve 36 and a check valve 37. The line 35 is provided with a control valve 38 and a check valve 39. A vent 40 controlled by a valve is provided in the upper portion of the kettle. Samples of the contents of the kettle may be removed through the sampling cock 41.

In starting operations, the kettle 6 may be employed as a heater or dealcoholizer, preferably in conjunction with other similar kettles. For example, fermented beer or liquid is run into kettle 6 until it is a little more than half full. Thus, if its capacity is 200 barrels, 105 barrels may be run into it. The stirrer 23 is then started in operation and the beer is heated to boiling by supplying steam to the jacket 11 in the bottom of the kettle. The gate valve 18 is kept open. Assuming that the beer employed has an alcohol content of 5% by volume, it will begin boiling at 95.8° C. The kettle being only a little more than half full, ample room is provided for the foam formed at the beginning of boiling. Boiling is continued until the vapors given off from the beer are free from the characteristic fusel oil odor, which is present in them in the beginning of the operation. In the specific instance cited, the beer is entirely free from fusel oil and from aldehydes when it has been reduced to an alcohol content of 3.50% by volume, at which point its boiling point at the altitude of Chicago is 97° C. The volume of the beer at this point is reduced to about 100 barrels at the boiling temperature, corresponding to about 95.7 barrels of cold beer in each kettle, 8.86% of beer having been evaporated.

When the point is reached at which the fusel oil and aldehyde is removed as above indicated, only sufficient steam is supplied to keep the beer in the kettle sufficiently hot (near the boiling point) to maintain a sufficient evolution of vapors to prevent access of air and aldehydes. During this entire operation, the lagging on the upper portion of the kettle prevents any return of reflux and aids in the elimination of aldehydes from the beer residue.

While the beer residue in the kettle is kept hot (near the boiling or simmering point), the valve 8 in the line 7 is opened, and sufficient additional hot beer residue from another similar operation is discharged into the kettle 6. The flow of beer continues until the level of liquid in the kettle 6 reaches the gate valve 18, which point can be readily observed by means of the gauge 21. The valve 18 is then closed tightly, so that the kettle 6 is entirely filled with beer residue which is entirely freed of fusel oil and aldehydes and which contains no air or oxygen. At this stage the alcohol content of the beer residue is about 3.25 to 3.5% by volume.

The beer residue in the kettle 6 is then cooled preferably, first by passing cold water through inlet pipe 14 to and through the jacket 13 around the kettle and out through the outlet pipe 15. When the beer residue has been partially cooled, for example, to about 32° C., the flow of water through the cooling jacket 13 is stopped, it is preferably drained, and the cooling is continued by flowing cold brine through inlet pipe 30, coils 29 within the tank and out of the outlet pipe 32. It is thereby brought to a temperature of 2° C. or lower when cooling is stopped. The volume of beer residue is reduced by cooling from 200 barrels hot residue to somewhat more than 191 barrels cold residue, the contraction being noted on the liquid gauge 21. In the operation as described, the space in the kettle above the cooled residue is highly evacuated, it being understood that if the kettle has not sufficient strength to withstand the strains set up by cooling, a gas completely free from oxygen, such as carbon-dioxide or nitrogen previously passed through an active oxygen absorbing medium, may be permitted to enter the top of the kettle, for example, through the line 34, during the cooling operation. No oxygen is permitted to come in contact with the surface of the cooling liquid for I have discovered that if the beer residue is cooled in the presence of an oxygen containing gas, up to 0.40% by volume of oxygen is dissolved and there is a substantial oxidation of the alcohol content to aldehydes, readily noticeable by the strong characteristic odor of a sample taken from the sampling cock 41.

After the beer residue has cooled, any vacuum or partial vacuum remaining in the kettle is broken by the introduction of carbon-dioxide through the lines 34 and 35, the carbon-dioxide being supplied, for example, under a pressure of about 25 lbs. gauge until a desired pressure is secured in the kettle. About 10 lbs. gauge has been found to be adequate. The beer residue may be forced by this pressure to the cold storage room, where it may be stored in containers, from which air is preferably previously removed, for example, by means of carbon-dioxide. It may then be made ready for the market by carbonating, filtering, bottling and pasteurizing in the bottles. Other trade packages may be employed, but bottles are preferred because the access of oxygen to the liquid, with the resultant formation of aldehydes from its alcohol content is more easily prevented. If desired, a small proportion of a phosphite or hypophosphite or of hypophosphorus acid may be added to the material before it is packaged; for example, the equivalent of 4 to 12 grams of an alkali metal phosphite or hypophosphite may be so added per barrel of the liquid.

If desired, instead of carbonating in the usual manner, cooled liquid may be carbonated in the kettle 6 in bulk. After the liquid has been cooled to the desired low temperature, as set forth above, the rotation of the stirrer 23 is continued, for example at a rate of 60 to 65 revolutions per minute, and the carbon-dioxide is allowed to enter the chamber from the line 33 through line 35. The pressure within the kettle gradually rises until a pressure slightly under that of the source of carbon-dioxide is reached. In order to continue the flow of the carbon-dioxide, the vent 40 may be slightly opened at this point, a small amount of carbon-dioxide permitted to escape and a continuous flow of the carbon-dioxide into the beverage produced. After the liquid has been carbonated, it may be packaged in any suitable manner in use in the trade, the same precautions being taken to avoid access of oxygen containing gas or air as has been previously mentioned.

The heating or boiling of beers and similar liquids in the ordinary manner imparts thereto a burnt or empyreumatic taste and odor; but by operating in accordance with my invention in which air is not permitted access nor contact with the liquid or residue, this burnt taste and odor is avoided.

In carrying out my invention, I prefer to apply indirect heat to the liquid under treatment, as the use of direct steam injection for heating introduces substantial quantities of air or oxygen.

This application is a division of my applicaton Serial No. 119,057, filed June 28, 1926.

I claim:

1. The method of carbonating a liquid which comprises cooling a body of such liquid, maintaining it at reduced temperature within a closed chamber in absence of oxygen, mechanically agitating the liquid within said chamber, supplying carbon-dioxide within the agitated body of liquid in said chamber, said carbon-dioxide being supplied under superatmospheric pressure, maintaining within the chamber a superatmospheric pressure of carbon-dioxide lower than that of the supply, and venting carbon-dioxide from the chamber above the liquid whereby a continuous flow of carbon-dioxide through the liquid is produced.

2. The method of carbonating a liquid which comprises filling a container with heated, gas-free liquid, cooling the liquid while permitting an oxygen-free gas to enter the space formed by contraction of the contents of the container, introducing into the cooled liquid a stream of carbon-dioxide under pressure to build up pressure therein and continuing the supply of carbon-dioxide in excess of that taken up by the liquid, and venting excess carbon-dioxide from the container.

3. The method of carbonating a liquid which comprises filling a container with heated, gas-free liquid, cooling the liquid while permitting an oxygen-free gas to enter the space formed by contraction of the contents of the container, introducing into the cooled liquid a stream of carbon-dioxide under pressure to build up pressure therein and continuing the supply of carbon-dioxide in excess of that taken up by the liquid while mechanically agitating the liquid, and venting excess carbon-dioxide from the container.

HERMAN HEUSER.